United States Patent
Roy et al.

(10) Patent No.: US 10,541,990 B2
(45) Date of Patent: Jan. 21, 2020

(54) CLIENT DEVICE TICKET

(71) Applicant: Aruba Networks, Inc., Sunnyvale, CA (US)

(72) Inventors: Sudeepto Kumar Roy, Bangalore (IN); Vaibhav Kumar, Bangalore (IN); Vamsi Krishna Bandlamudi, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 121 days.

(21) Appl. No.: 15/665,267

(22) Filed: Jul. 31, 2017

(65) Prior Publication Data

US 2019/0036905 A1    Jan. 31, 2019

(51) Int. Cl.
*H04L 29/06* (2006.01)
*H04L 9/32* (2006.01)

(52) U.S. Cl.
CPC ........ *H04L 63/0807* (2013.01); *H04L 9/3213* (2013.01); *H04L 63/0428* (2013.01); *H04L 63/06* (2013.01); *H04L 2463/121* (2013.01)

(58) Field of Classification Search
CPC .............. H04L 63/0807; H04L 9/3213; H04L 63/0428; H04L 63/06; H04W 12/06
See application file for complete search history.

(56) References Cited

U.S. PATENT DOCUMENTS

| | | | | |
|---|---|---|---|---|
| 6,263,432 B1 * | 7/2001 | Sasmazel | ............ | G06F 21/335 713/100 |
| 7,913,294 B1 * | 3/2011 | Maufer | ............ | H04L 12/66 370/389 |
| 8,272,039 B2 * | 9/2012 | Bennett | ............ | H04L 63/08 726/27 |
| 9,405,896 B2 | 8/2016 | Simone et al. | | |
| 9,614,831 B2 | 4/2017 | Shah et al. | | |
| 2003/0204744 A1 * | 10/2003 | Maltais | ............ | H04L 63/0236 726/12 |
| 2005/0154923 A1 * | 7/2005 | Lok | ............ | H04L 63/0428 726/19 |
| 2005/0273848 A1 * | 12/2005 | Charles | ............ | H04L 63/0807 726/11 |
| 2010/0095359 A1 * | 4/2010 | Gordon | ............ | H04W 12/06 726/6 |

(Continued)

OTHER PUBLICATIONS

Gchandrasekaran, "Captive Portal with Session Cookie and One Minute Idle Timer Does Not Present a Web Form Page", www.paloaltonetworks.com, Jan. 16, 2015, 3 pages.

*Primary Examiner* — Yonas A Bayou
(74) *Attorney, Agent, or Firm* — Brooks, Cameron & Huebsch, PLLC (57) ABSTRACT

A system may include a client device to connect to a network and a network device communicatively coupled to the client device. The network device may determine that the client device has been authenticated to the network via a captive portal page. The network device may further create a ticket corresponding to the client device. Possession of the ticket by the client device may indicate authentication of the client device to the network. The network device may then transmit the ticket to the client device for storage on the client device. The stored ticket may enable the client device to remain authenticated to the network after a period of inactivity.

15 Claims, 4 Drawing Sheets

(56) References Cited

U.S. PATENT DOCUMENTS

| | | | | |
|---|---|---|---|---|
| 2010/0107225 A1* | 4/2010 | Spencer | ............. | H04L 63/0876 |
| | | | | 726/4 |
| 2010/0263022 A1* | 10/2010 | Wynn | ................... | H04W 12/06 |
| | | | | 726/3 |
| 2011/0086612 A1* | 4/2011 | Montz | .................. | H04L 63/083 |
| | | | | 455/410 |
| 2012/0192258 A1* | 7/2012 | Spencer | ............... | H04W 12/06 |
| | | | | 726/7 |
| 2012/0264402 A1* | 10/2012 | Zhang | ................ | H04L 63/0815 |
| | | | | 455/411 |
| 2013/0268666 A1* | 10/2013 | Wilson | ................... | H04L 63/08 |
| | | | | 709/225 |
| 2014/0047510 A1 | 2/2014 | Belton et al. | | |
| 2014/0195380 A1 | 7/2014 | Jamtgaard et al. | | |
| 2015/0067774 A1 | 3/2015 | Alkhaled et al. | | |

\* cited by examiner

CLIENT DEVICE TICKET

BACKGROUND

Networks may use captive portals to control access to the network. Captive portals may authenticate a client device, granting the client device access to the network. This access may be for a finite period of time and may cease upon disconnection of the client device or inactivity by the client device.

DETAILED DESCRIPTION

Captive portals may be used to provide users access to a network. When a user first attempts to connect to a network that uses a captive portal, the user may be redirected to a captive portal page. The captive portal page may ask the user to input identifying information, such as a username and/or password, to verify the user's access to the network. Once the captive portal has verified the inputted identifying information, the user may be granted access to the network and its resources. Conversely, if the captive portal is unable to verify the user as an authenticated user through the inputted identifying information, the user may be denied access to the network or have limited access to the network.

When a user is granted access to the network via a captive portal page, user context may be saved. As used herein, user context refers to identifying information corresponding to a user and/or the user's device. For example, user context can include a user's name, an Internet Protocol (IP) address of the user's device, a Media Access Control (MAC) address of the device, or a combination thereof, among others. The user context may be stored on an access point of the network. An access point can refer to a networking device that allows a client device to connect to a wired or wireless network. As used herein, the term "access point" (AP) can, for example, refer to receiving points for any known or convenient wireless access technology which may later become known. Specifically, the term AP is not intended to be limited to IEE 802.11-based APs. APs may function as an electronic device that is adapted to allow wireless devices to connect to a wired network via various communications standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include a memory resource, including read-write memory, and a hierarchy of persistent memory such as ROM, EPROM, and Flash memory. In some examples, the user context may be stored on the AP corresponding to the user's connection to the network. That is, the user context may be stored on the AP providing access to the network for the user. In some examples, the user context may be stored on an AP different than the AP that provides access to the network for the user. For instance, the user context may be stored on an AP that is designated as a storage AP and stores user contexts for a plurality of users.

When a user is connected to, and active on, the network, the network can store the corresponding user context. However, in some circumstances, the user context may be deleted from the network. That is, the user context may be erased from storage on the AP. In some examples, the user context may be deleted when the user disconnects from the network by, for example, turning off the user device. In some examples, the user context may be deleted after a period of inactivity by the user. For instance, a user who is connected to the network but inactive for a predetermined period of time may have the corresponding user context deleted. Deleting the user context may assist the AP in making space available to store user contexts for users who are connected to and/or active on the network.

However, when a user context is deleted, the network does not retain a record of the user being previously authenticated by and/or connected to the network. Therefore, a user whose user context has been deleted may be redirected to the captive portal page upon an attempt to reconnect to the network at a later time or after a period of inactivity. The user may then be directed to reenter the authenticating or identifying information before being granted access to the network and its resources again.

By contrast, a client device ticket according to the present disclosure may allow a user to disconnect from a network or remain inactive for a period of time without being redirected to a captive portal page upon reconnection. When a user initially connects a client device to a network, the user may be directed to a captive portal page, where the user may be prompted to input identifying and/or authenticating information. Upon authentication, a ticket may be created and stored on the client device. The ticket may include information similar to user context information, such as a MAC address, a user name, and/or an IP address.

If a client device disconnects from or remains inactive on the network, a client device ticket according to the present disclosure may allow reconnection to the network without redirection to the captive portal page. When a client device attempts to reconnect to the network, the network may receive the ticket stored on the client device. The network may confirm that the information stored within the ticket corresponds to the client device and indicates a previous authentication to the network. If the ticket indicates a previous authentication to the network by the client device, the network may grant the client device access to the network without redirecting the client device to the captive portal page. As a result, the client device may be able to reconnect to the network more quickly as the additional time added by redirection to a captive portal page may be eliminated.

Figure 1:
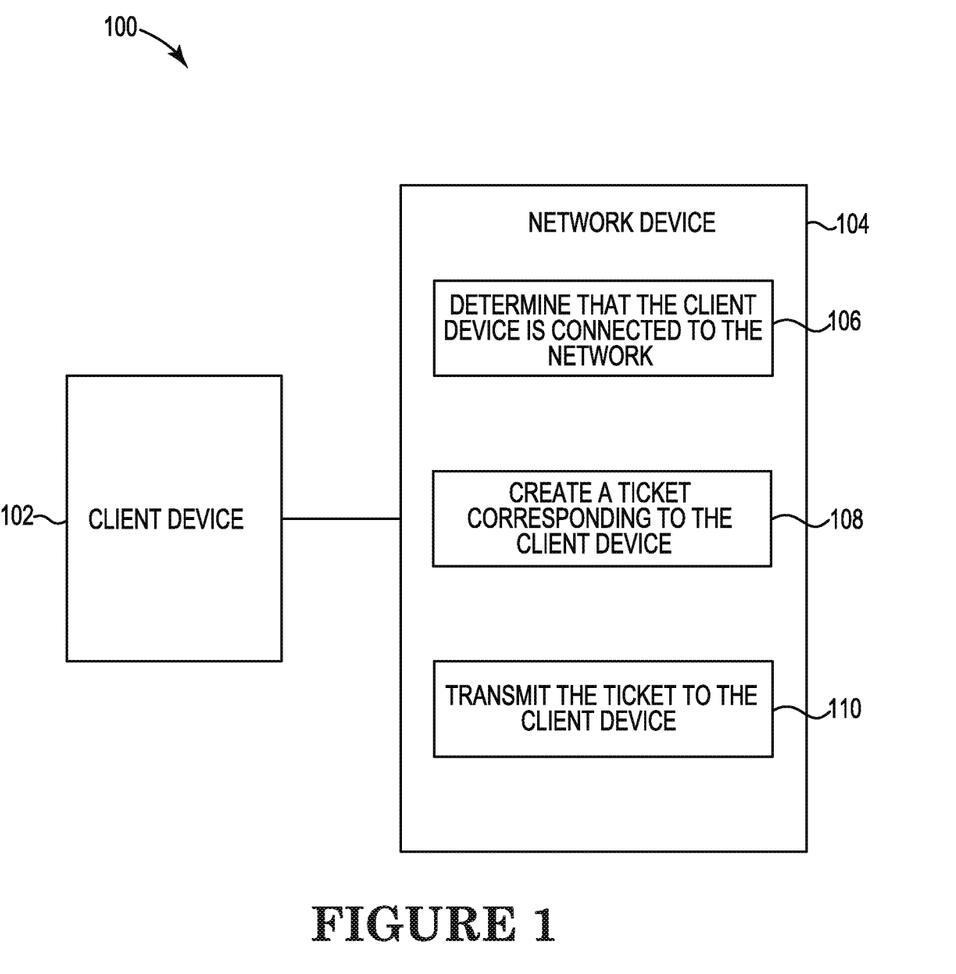
FIG. 1 is an example system for a client device ticket consistent with the present disclosure.

FIG. 1 is an example system 100 for a client device ticket according to the present disclosure. System 100 may include a client device 102. As used herein, the term "client device" can, for example, refer to a device including a processing resource, memory, and input/output interfaces for wired and/or wireless communication. For example, a client device may include a laptop computer, a desktop computer, a mobile device, and/or other wireless devices, although examples of the disclosure are not limited to such devices. A mobile device may, for example, refer to a device that is (or may be) carried and/or worn by a user. For instance, a mobile device can be a phone (e.g., a smart phone), a tablet, a personal digital assistant (PDA), smart glasses, and/or a wrist-worn device (e.g., a smart watch), among other types of mobile devices.

Client device 102 may be connected to network device 104. As used herein, the term "network device" can, for example, refer to a device that is adapted to transmit and/or receive signaling and to process information within such signaling such as a station (e.g., any data processing equipment such as a computer, cellular phone, personal digital assistant, tablet devices, etc.), an AP, a wireless beacon transmitter/receiver, a wireless sensor, data transfer devices (such as network switches, routers, controller, etc.) or the like. In some examples, client device 102 may be connected to network device 104 by a wired connection, such as by an electrical wire, optical fiber, cable, etc. In other examples, client device 102 may be connected to network device 104 via a wireless connection, such as by an IEEE 802.11 Wi-Fi connection.

The network device 104 may perform a variety of functions within the network, as illustrated in FIG. 1. At 106, network device 104 may determine that the client device 102 has been authenticated to the network. In some examples, the network device 104 may determine that the client device 102 has been authenticated to the network at 106 by determining that the client device 102 has been redirected to a captive portal page and has been authenticated at the captive portal page. For example, the network device 104 may determine that the client device 102 has previously entered authentication data at a captive portal page such that the authentication data allows the client device 102 to connect to the network. Such a determination may allow network device 104 to determine that client device 102 is authenticated to the network at 106.

At 108, the network device 104 may create a ticket corresponding to the client device 102. As used herein, a ticket refers to a cookie that contains information pertaining to the client device. The ticket may comprise information identifying the client device 102. In some examples, the ticket may indicate that the client device 102 is authenticated to the network as previously determined by the network device 104 at 106. For example, the ticket may include authentication information entered by the client device 102 at the captive portal page. The ticket may further include a time at which the client device 102 connected to the network. In some examples, possession of the ticket may indicate authentication of the client device to the network. That is, having the ticket may demonstrate, by way of the information included within the ticket, that the client device is authenticated to the network.

In some examples, the network device 104 may receive information from the client device 102 corresponding to the client device 102. The information received from the client device 102 may include a MAC address of the client device 102, an IP address of the client device 102, and a user agent of the client device 102. As used herein, a user agent refers to a user of a client device. The user may be identified by, for example, a user name or identification, which may identify the user as being a particular person and/or as belonging to a particular group of people. The network device 104 may create a ticket corresponding to the client device 102 at 108 in response to receiving the information from the client device 102. In some examples, the ticket created by the network device 104 at 108 may include the information transmitted to the network device 104 by the client device 102. That is, the ticket created at 108 by the network device 104 may include a MAC address of the client device 102, an IP address of the client device 102, and a user agent of the client device 102.

Once the ticket is created at 108, the network device 104 may transmit the ticket to the client device 102 at 110. In some examples, the ticket may be transmitted to the client device 102 at 110 via the wired or wireless connection between the client device 102 and network device 104. The ticket may be transmitted at 110 to the client device 102 for storage on the client device 102. That is, at 110, the ticket may be transmitted to the client device 102 from network device 104 and stored on the client device 102.

In some examples, the network device 104 may encrypt the ticket corresponding to the client device 102. The network device 104 may encrypt the ticket using a secret key. As used herein, a secret key refers to a piece of information or a parameter used to encrypt data. In secret key encryption, a single key can be used to both encrypt and decrypt the data. The network device 104 may encrypt the ticket once the ticket is created at 108. An identifier of the secret key used to encrypt the ticket may be included within the ticket created at 108, in addition to the MAC address of the client device 102, the IP address of the client device 102, and the user agent of the client device 102. Inclusion of an identifier of the secret key within the ticket may occur so that when seeking to decrypt the ticket, the correct secret key is used. In some examples, the network device 104 may transmit the encrypted ticket to the client device 102 at 110. The encrypted ticket may be stored on the client device 102. Upon encryption of the ticket, the secret key may be stored on the network device 104. Storage of the secret key on the network device 104 may allow the network device to decrypt the ticket stored on the client device 102 at a later time.

Figure 2:
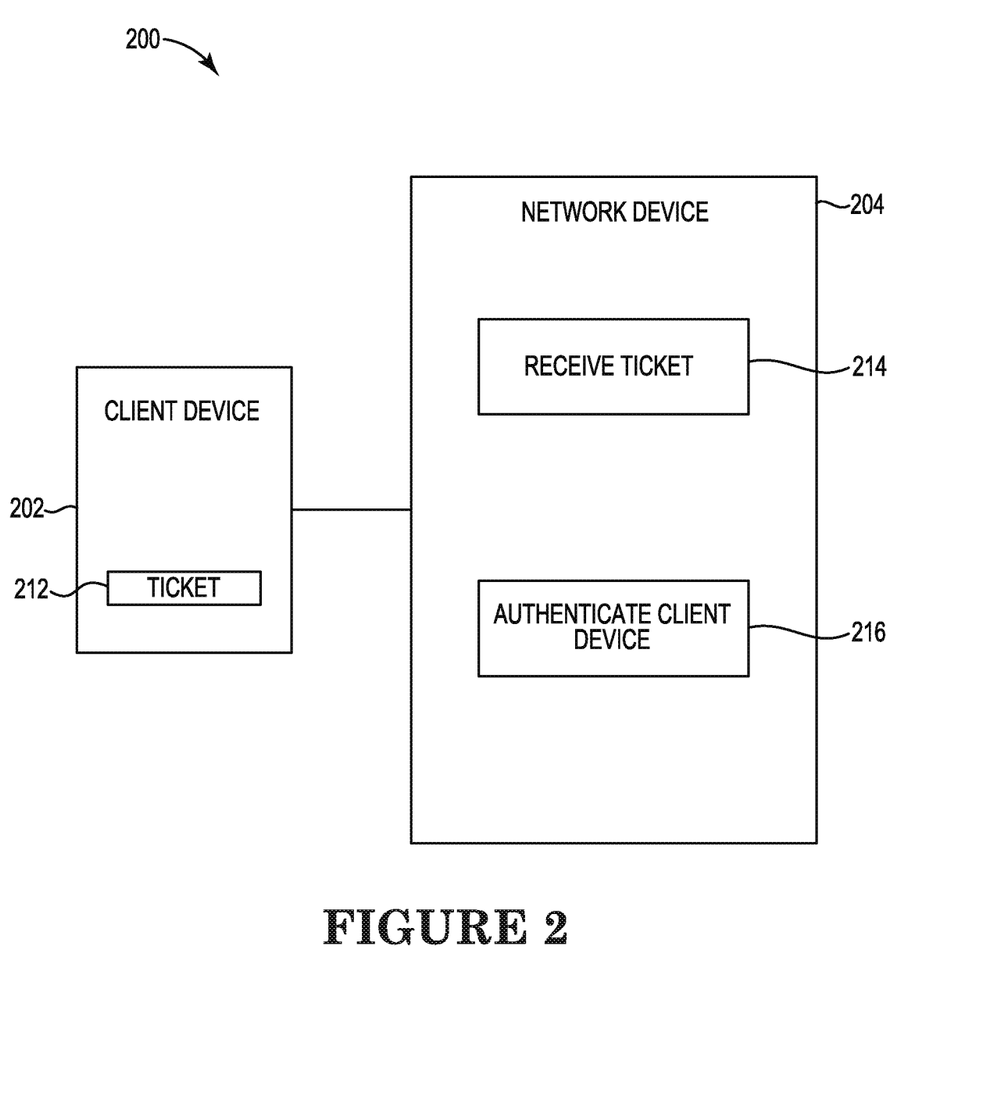
FIG. 2 is another example system for a client device ticket consistent with the present disclosure.

FIG. 2 is another example system 200 for a client device ticket according to the present disclosure. System 200 may include a client device 202. Client device 202 may be akin to client device 102, described previously with respect to FIG. 1. System 200 may further include a network device 204. Network device 204 may be akin to network device 204, described previously with respect to FIG. 1. As shown in FIG. 2, client device 202 may be coupled to network device 204. This coupling may be wired, such as by an electrical wire, optical fiber, cable, etc., or wireless, such as by an IEEE 802.11 Wi-Fi connection.

Client device 202 may include a ticket 212. As described with respect to FIG. 1, a ticket refers to a cookie storing information pertaining to the client device. The ticket 212 may be stored on client device 202 and may comprise information identifying the client device 202. As discussed with respect to FIG. 1, the ticket may be created by the network device at 108 and transmitted to the client device 102 for storage at 110. Ticket 212 may correspond to the ticket created at 108 and transmitted from the network device 104 to the client device 102 at 110, as described with respect to FIG. 1. Moreover, as discussed with respect to FIG. 1, the ticket created by network device 104 may be encrypted using, for example, a secret key. Thus, ticket 212 may be an encrypted ticket stored on client device 202.

The network device 204 may receive the ticket 212 from the client device 202 at 214. In some examples, the network device 204 may receive the ticket 212 from the client device 202. In such examples, the network device 204 may receive the ticket 212 via the connection between client device 202 and network device 204.

At 216, network device 204 may authenticate client device 202. In some examples network device 204 may authenticate client device 202 at 216 in response to a determination that the ticket 212 corresponds to a prior authentication to the network by the client device 202. For example, the client device 202 may be authenticated at 216 by the network device 204 if the ticket 212 demonstrates that the client device 202 was previously authenticated to the network via a captive portal page. In some examples, the client device 202 may be authenticated at 216 without being redirected to a captive portal page. That is, authentication of the client device 202 at 216 may occur without the client device 202 inputting identifying and authenticating information at a captive portal page.

In some examples, the network device 204 may determine a secret key used to encrypt the ticket 212. Network device 204 may decrypt the ticket 212 using the secret key. As described previously with respect to FIG. 1, the secret key may be stored on the network device; thus, network device 204 may decrypt the ticket 212 using a secret key stored on network device 204. Further, prior to decrypting the ticket 212, the network device 204 may perform a message authenticity check on the ticket 212. As used herein, a message authenticity check refers to a determination of the integrity of a ticket received by a network device. In some examples, network device 204 may perform a message authenticity check on ticket 212 to determine the origin of ticket 212. That is, network device 204 may check ticket 212 to determine that ticket 212 was issued by the network prior to decryption.

Upon decryption of the ticket 212 at the network device 204, the network device 204 may determine that information included in the decrypted ticket matches information of the client device. For example, as described with respect to FIG. 1, the ticket may include an IP address of the client device, a MAC address of the client device, a user agent associated with the client device and/or a time at which the client device connected to the network. Network device 204 may compare the decrypted information contained within ticket 212 against the information of the client device 202. For instance, network device 204 may compare the IP address contained within ticket 212 with the IP address of client device 202, the MAC address contained within ticket 212 with the MAC address of client device 202, and the user agent contained within ticket 212 with the user agent of client device 202. Network device 204 may determine that the information included in the decrypted ticket 212 matches information of the client device 202. In response to this determination, network device 204 may authenticate the client device as an authorized user for the network at 216.

In some examples, the network device 204 may determine the secret key used to encrypt the ticket 212. The network device 204 may further determine that the secret key used to encrypt the ticket 212 is stored on a second network device. As described previously, a second network device may be employed to store user contexts for multiple users and network devices within a network. Similarly, a second network device may store a plurality of secret keys used to encrypt tickets within a network. The second network device may be part of the same network as network device 204 and may be communicatively coupled with network device 204 via a wired or a wireless connection. As used herein, to be communicatively coupled refers to two or more devices connected by, e.g., a wired or wireless connection such that the two or more devices are able to transmit information from one device to another device through the connection. Said differently, devices that are communicatively coupled are able to share information among themselves.

Once network device 204 has determined that the secret key used to encrypt ticket 212 is stored on a second network device, network device 204 may retrieve the secret key from the second network device. The network device 204 may retrieve the secret key via the wired or wireless connection between network device 204 and the second network device. Network device 204 may use the retrieved secret key to decrypt the ticket 212. In some examples, once ticket 212 is decrypted, network device 204 may perform a comparison of the information stored on the ticket 212 with the information corresponding to the client device 202 to determine whether the client device 202 had a previous connection to the network. In some examples, after decrypting ticket 212 with the secret key, network device 204 can retrieve a MAC address, an IP address, and a user agent information from ticket 212. Next, network device 204 can check data path for a session entry that includes the same MAC address, IP address, and/or user agent. If there is a match, then network device 204 can allow client device 202 to access the network based on its possession of ticket 212. That is, when the network device 204 determines that the client device 204 had a previous connection to the network, network device 204 may authenticate the client device 202 as an authorized user for the network at 216. If there is no matched user entry, then network device 204 can deny access to the network by client device 202.

Figure 3:
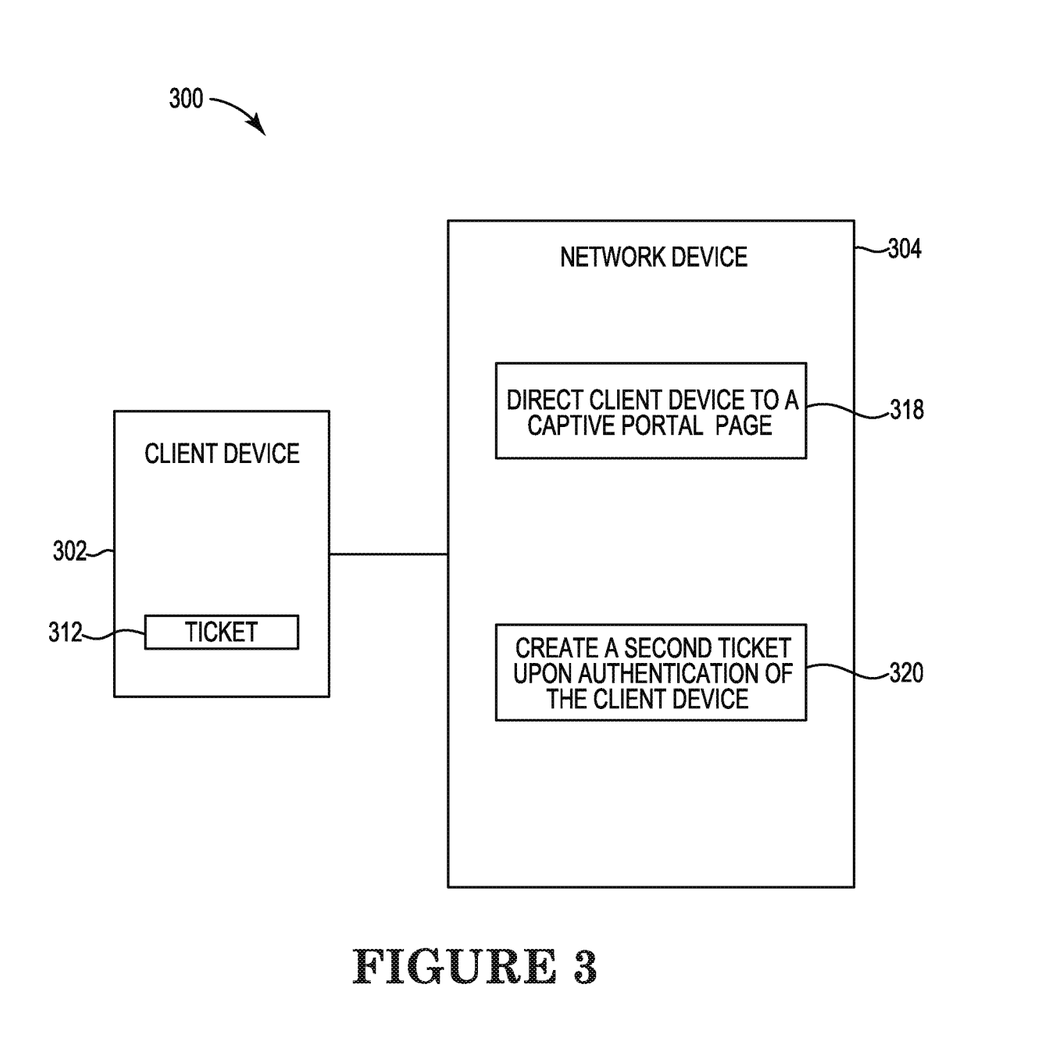
FIG. 3 is another example system for a client device ticket consistent with the present disclosure.

FIG. 3 is another example system 300 for a client device ticket according to the present disclosure. System 300 may include a client device 302. Client device 302 may be akin to client device 102 and client device 202, discussed previously with respect to FIGS. 1 and 2, respectively. System 300 may further include a network device 304. Network device 304 may be akin to network device 104 and network device 204, discussed previously with respect to FIGS. 1 and 2, respectively. Client device 302 may be communicatively coupled with network device 304 via, for example, a wired connection or a wireless connection.

Client device 302 may include a ticket 312. Ticket 312 may be akin to ticket 212, described previously with respect to FIG. 2. As previously described, ticket 312 may include information corresponding to the client device 302, such as an IP address of the client device 302, a MAC address of the client device 302, and a user agent of the client device 302. Ticket 312 may further store a timestamp corresponding to a time at which the client device 302 previously connected to the network.

As described with respect to FIG. 2, network device 304 may receive the ticket 312 from the client device 302. Network device 304 may decrypt the ticket 312. As discussed previously, ticket 312 may include information identifying the client device 302. Network device 304 may compare the information contained within ticket 312 to determine whether client device 302 is an authenticated user for the network. For example, network device 304 may compare the IP address stored on the ticket 312 with the IP address of the client device 302, the MAC address stored on the ticket 312 with the MAC address of the client device 302, and/or the user agent stored on the ticket 312 with the user agent of the client device 302.

In some examples, network device 304 may determine that the ticket 312 does not correspond to a prior connection to the network by the client device 302. The network device 304 may, for example, determine that the information contained within the ticket 312 does not correspond to the client device 302. For instance, the network device 304 may determine that the IP address stored on the ticket 312 does not correspond to the IP address of the client device 302 or that the MAC address stored on the ticket 312 does not correspond to the MAC address of the client device 302.

At 318, in response to a determination that the ticket 312 does not correspond to a prior connection to the network by the client device 302, network device 304 may redirect the client device 302 to a captive portal page. Once the client device 302 reaches the captive portal page, the captive portal page may prompt input of authenticating information. Network device 304 may verify the information and authenticate client device 302 as an authorized user for the network.

At 320, network device 304 may create a second ticket corresponding to client device 302 upon authentication of the client device 302 at the captive portal page by network device 304. As described previously with respect to FIG. 1, the ticket may contain information transmitted from client device 302 to network device 304. Moreover, the ticket may be encrypted using, for example, a secret key. The second ticket may be transmitted by network device 304 to client device 302, where it may be stored on client device 302. The second ticket may serve to replace ticket 312 and may include updated information corresponding to client device 302.

In some examples, determining that the ticket 312 does not correspond to a prior network connection to the network by client device 302 may include decrypting the ticket 312 at network device 304. The ticket 312 may include a timestamp corresponding to a time at which the client device 302 previously connected to the network. Network device 304 may determine that the timestamp contained within the ticket 312 is expired. That is, network device 304 may determine that a particular amount of time has elapsed. In some examples, the particular amount of time may correspond to an amount of time during which a ticket, such as ticket 312, is valid. That is, the particular amount of time may be a time period during which a ticket, such as ticket 312, may be used to authenticate a client device, such as client device 302, as an authorized user of a network.

When ticket 312 contains an expired timestamp, network device 304 may redirect client device 302 to a captive portal page. Upon input and verification of authentication information by client device 302 to the captive portal page, network device 304 may grant client device 302 access to the network. Network device 304 may further create a second ticket corresponding to client device 302. The second ticket may include information corresponding to the client device 302, as previously described. In addition, the second ticket may include a second timestamp corresponding to the second connection to the network by the client device 302.

Figure 4:
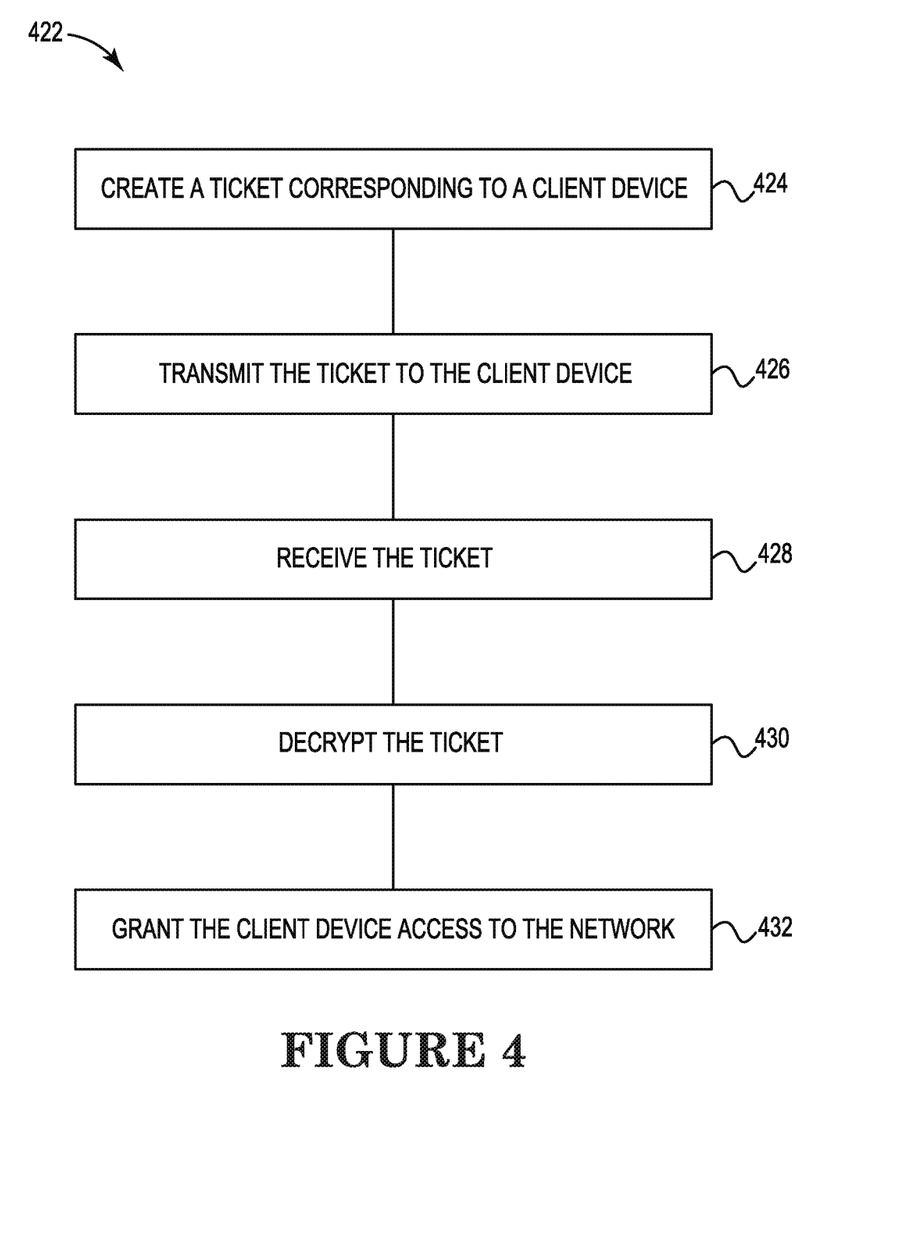
FIG. 4 is an example method for a client device ticket consistent with the present disclosure.

FIG. 4 is an example method 422 for a client device ticket according to the present disclosure. At 424, method 422 may include creating a ticket corresponding to a client device connected to the network. The client device may correspond to client device 102, client device 202, and client device 302, described with respect to FIGS. 1, 2, and 3, respectively. The ticket may correspond to ticket 212 and ticket 312, described with respect to FIGS. 2 and 3. In some examples, creating a ticket at 424 may include creating a ticket at a first time. As used herein, a first time refers to a time at which a ticket is created. In some examples, a ticket created at 424 may be created by a network device, such as network device 104, 204, or 304, described with respect to FIGS. 1, 2, and 3. As described previously, creating a ticket may include receiving information from the client device. The information may be received at a network device and may include information corresponding to the client device, as well as a determined time at which the client device connected to the network.

Creating a ticket corresponding to the client device at 424 may further include encrypting the information received at the network device. As described previously, the information may be encrypted at the network device through use of a secret key. The secret key may be stored on the network device to allow for later decryption of the information.

At 426, method 422 may include transmitting the ticket to the client device. As described with respect to FIG. 1, the ticket may be transmitted to the client device from the network device via a connection between the client device and the network device. That is, the client device and the network device may be communicatively coupled to one another, such that information including a created ticket may be transferred between the client device and the network device. In some examples, transmitting the ticket to the client device at 426 may include transmitting the ticket to the client device for storage of the ticket on the client device.

At 428, method 422 may include retrieving the ticket from the client device at a second time. As used herein, a second time refers to a time at which the ticket is received. The second time may occur subsequent to the first time; that is, the second time may occur at a later point with respect to the first time. The ticket may be received from the client device using the connection used to transmit the ticket to the client device for storage at 426. That is, receiving the ticket from the client device at 428 may involve the communication means used to transmit the ticket. In some examples, the ticket may be received from the client device by the network device. Upon receipt, the ticket may be transferred to the network device.

At 430, method 422 may include decrypting the ticket. Decrypting the ticket at 430 may include determining a secret key used to encrypt the ticket. Upon a determination of the secret key used to encrypt the ticket, decrypting the ticket at 430 may further include retrieving the secret key from a network device. In some examples, the network device may store a plurality of keys. As described previously, a network device may be designated as a storage device to store a plurality of secret keys for a network. The network device coupled to the client device may retrieve the secret key from this storage network device, such that the network device may decrypt the ticket. Further, prior to decrypting the ticket at 430, the network device may perform a message authenticity check on the ticket to determine the origin of the ticket. That is, the network device 204 may check ticket 212 to determine that the ticket was issued by the network prior to decrypting the ticket at 430.

At 432, method 422 may include granting the client device access to the network. Granting the client device access to the network at 432 may occur in response to a determination that the client device is an authenticated user for the network, and the determination that the client device is an authenticated user for the network may be based on information included within the decrypted ticket. As described previously, the ticket may include information corresponding to the client device, such as a MAC address, an IP address, and/or a user agent. Determining that a client device is an authenticated user of the network, therefore, may include determining that a MAC address included in the ticket matches a MAC address of the client device. Additionally, determining that a client device is an authenticated user of the network may include determining that an IP address included in the ticket matches an IP address of the client device. Moreover, determining that a client device is an authenticated user of the network may include determining that information corresponding to a user agent included in the ticket matches information corresponding to a user agent of the client device. If the MAC address, IP address, and user agent information match between the ticket and the client device, the client device may be granted access to the network at 432.

Method 422 may further include denying the client device access to the network. Access to the network may be denied in response to a determination that the client device is not an authenticated user for the network. In some examples, the determination that the client device is not an authenticated user for the network may be based on information included in the decrypted ticket. For example, a MAC be based on information included in the decrypted ticket. For example, a MAC address contained within the ticket may not match a MAC address of the client device, an IP address contained within the ticket may not match an IP address of the client device, and/or user agent information contained within the ticket may not match user agent information for the client device. Therefore, the client device may not be authenticated and access to the network may be denied for the client device.

Method 422 may further include redirecting the client device to a captive portal page. The client device may be redirected to the captive portal page in response to the determination that the client device is not an authenticated user for the network. That is, the client device may be redirected to the captive portal page upon a denial of access to the network. Once redirected to the captive portal page, the client device may receive prompts to input authentication information. Upon input and verification of the authentication information, the client device may be granted access to the network.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to any number of such elements and/or features.

What is claimed:

1. A system, comprising:
a network device including an interface to provide access to a network, the network device being communicatively coupled to a client device, the network device to:
determine that the client device has been authenticated to the network via a captive portal page;
create a ticket comprising information identifying the client device and a timestamp value, encrypt the ticket using a secret key, and insert an identifier for the secret key in the encrypted ticket, the secret key being stored on a second network device;
transmit the encrypted ticket to the client device for storage on the client device;
receive a request from the client device to reconnect to the network, wherein the client device provides the encrypted ticket;
identify the secret key based on the identifier in the ticket, determine that the secret key is stored on the second network device, and retrieve the secret key from the second network device;
decrypt the ticket using the retrieved secret key; and
upon determining that the decrypted ticket corresponds to an authenticated session to the network by the client device, reauthenticate the client device to the network without direction of the client device to the captive portal page.

2. The system of claim 1, further comprising the network device to:
receive, from the client device, information corresponding to the client device, wherein the information includes:
a Media Access Control (MAC) address of the client device;
an Internet Protocol (IP) address of the client device; and
a user agent of the client device; and
create the ticket corresponding to the client device in response to receipt of the information corresponding to the client device, wherein the ticket includes at least the MAC address of the client device, the IP address of the client device, and the user agent of the client device.

3. The system of claim 1, wherein, in response to a determination that the decrypted ticket does not correspond to an authenticated session to the network by the client device, the network device to:
deny the request to reconnect to the network;
redirect the client device to the captive portal page; and
create a second ticket upon authentication of the client device at the captive portal page.

4. The system of claim 1, wherein determining that the decrypted ticket corresponds to an authenticated session to the network by the client device includes the network device to determine if a data path for a session entry includes the information identifying the client device from the decrypted ticket.

5. The system of claim 1, wherein the network device is further to perform a message authenticity check to authenticate an origin of the ticket.

6. The system of claim 1, wherein the second network device is designated as a storage for a plurality of secret keys.

7. An access point, comprising:
a processing resource and a memory resource;
a transmitter and receiver; and
an interface with a network, wherein the access point is to:
receive a request from a client device to connect to the network and direct the client device to a captive portal page for authentication;
upon authentication of the client device, create a ticket comprising information identifying the client device and a timestamp value, encrypt the ticket using a secret key, and insert an identifier for the secret key in the encrypted ticket, the secret key being stored on a network device connected with the network;
transmit the encrypted ticket to the client device for storage on the client device;
receive a request from the client device to reconnect to the network, wherein the client device provides the encrypted ticket;
identify the secret key based on the identifier in the ticket, determine that the secret key is stored on the network device, and retrieve the secret key from the network device;
decrypt the ticket using the retrieved secret key; and upon determining that the decrypted ticket corresponds to an authenticated session to the network by the client device, reauthenticate the client device to the network without direction of the client device to the captive portal page.

8. The access point of claim 7, wherein, in response to a determination that the decrypted ticket does not correspond to an authenticated session to the network by the client device, the access point to:
deny the request to reconnect to the network;
redirect the client device to the captive portal page; and
create a second ticket upon authentication of the client device at the captive portal page.

9. The access point of claim 8, wherein determining that the decrypted ticket does not correspond to an authenticated session to the network by the client device includes the access point to:
determine that the timestamp of the decrypted ticket is expired.

10. The access point of claim 7, wherein determining that the decrypted ticket corresponds to an authenticated session to the network by the client device includes the access point to:
determine that information included in the decrypted ticket matches information of the client device.

11. The access point of claim 7, wherein a user context for the client device is deleted from the access point upon the client device being disconnected from the network.

12. A method, comprising:
creating at a first network device a ticket corresponding to a client device authenticated to a network via a captive portal page, the ticket comprising information identifying the client device and a timestamp value;
encrypting the ticket using a secret key and inserting an identifier for the secret key in the encrypted ticket, the secret key being stored on a second network device;
transmitting the encrypted ticket to the client device for storage on the client device;
receiving, at the first network device, a request from the client device to reconnect to the network, wherein the client device provides the encrypted ticket;
identifying the secret key based on the identifier in the ticket, determining that the secret key is stored on the second network device, and retrieving the secret key from the second network device;
decrypting the ticket using the retrieved secret key; and
upon determining that the decrypted ticket corresponds to an authenticated session to the network by the client device, reauthenticate the client device to the network without direction of the client device to the captive portal page.

13. The method of claim 12, upon determining that the decrypted ticket does not correspond to an authenticated session to the network by the client, further comprising:
denying the client device access to the network,
redirecting the client device to the captive portal page; and
creating a second ticket upon authentication of the client device at the captive portal page.

14. The method of claim 12, wherein the encrypted includes information received at the first network device, wherein the information corresponds to the client device and a determined time at which the client device connected to the network.

15. The method of claim 12, wherein determining that the decrypted ticket corresponds to an authenticated session to the network by the client includes:
determining that a Media Access Control (MAC) address included in the decrypted ticket matches a MAC address of the client device;
determining that an Internet Protocol (IP) address included in the decrypted ticket matches an IP address of the client device; and
determining that a user agent information included in the decrypted ticket matches a user agent information of the client device.

* * * * *